US010607406B2

(12) United States Patent
Sen et al.

(10) Patent No.: US 10,607,406 B2
(45) Date of Patent: Mar. 31, 2020

(54) AUTOMATED AND ADAPTIVE THREE-DIMENSIONAL ROBOTIC SITE SURVEYING (71) Applicant: General Electric Company, Schenectady, NY (US)

(72) Inventors: Shiraj Sen, Clifton Park, NY (US); Steven Robert Gray, Niskayuna, NY (US); Arpit Jain, Niskayuna, NY (US); Huan Tan, Clifton Park, NY (US); Douglas Forman, Niskayuna, NY (US); Judith Ann Guzzo, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 15/879,743

(22) Filed: Jan. 25, 2018

(65) Prior Publication Data
US 2019/0228573 A1 Jul. 25, 2019

(51) Int. Cl.
*G06T 17/10* (2006.01)
*G01B 11/24* (2006.01)
(Continued)

(52) U.S. Cl.
CPC .............. *G06T 17/10* (2013.01); *G01B 11/24* (2013.01); *G01B 15/04* (2013.01); *G01B 17/06* (2013.01);
(Continued)

(58) Field of Classification Search
USPC .......................................................... 701/3
See application file for complete search history.

(56) References Cited

U.S. PATENT DOCUMENTS

2014/0336928 A1* 11/2014 Scott ...................... G01N 21/88
701/468
2015/0066248 A1 3/2015 Arbeit et al.
(Continued)

FOREIGN PATENT DOCUMENTS

WO 2015175440 A1 11/2015

OTHER PUBLICATIONS

Terwilliger, Brent A. et al., "Advancement and Application of Unmanned Aerial System Human-Machine-Interface (HMI) Technology", International Conference on Human Interface and the Management of Information, 2014, https://link.springer.com/chapter/10.1007%2F978-3-319-07863-2_27, (pp. 273-283, 11 total pages).
(Continued)

*Primary Examiner* — Lail A Kleinman
*Assistant Examiner* — Mahmoud M Kazimi
(74) *Attorney, Agent, or Firm* — Fletcher Yoder, P.C.

(57) ABSTRACT

A method for generating a three-dimensional model of an asset includes receiving input parameters corresponding to constraints of a mission plan for operating an unmanned vehicle around an asset, generating the mission plan based on the input parameters including information of a representative asset type, wherein the mission plan includes waypoints identifying locations and orientations of one or more image sensors of the unmanned vehicle, generating a flight path for the unmanned vehicle connecting the waypoints that satisfy one or more predefined criteria, monitoring a vehicle state of the unmanned vehicle during execution of the flight path from one waypoint to the next waypoint, determining, at each waypoint, a local geometry of the asset sensed by the one or more image sensors, changing the mission plan on-the-fly based on the local geometry, and capturing images of the asset along waypoints of the changed mission plan.

18 Claims, 7 Drawing Sheets (51) Int. Cl.
  *G05D 1/10* (2006.01)
  *G06T 7/70* (2017.01)
  *G06T 17/05* (2011.01)
  *G01B 21/20* (2006.01)
  *G01B 17/06* (2006.01)
  *G01S 17/89* (2006.01)
  *G01B 15/04* (2006.01)
  *B64C 39/02* (2006.01)
  *B63G 8/00* (2006.01)
  *G06T 19/00* (2011.01)

(52) U.S. Cl.
  CPC .............. *G01B 21/20* (2013.01); *G01S 17/89* (2013.01); *G05D 1/101* (2013.01); *G06T 7/70* (2017.01); *G06T 17/05* (2013.01); *G06T 19/003* (2013.01); *B63G 2008/005* (2013.01); *B64C 39/024* (2013.01); *B64C 2201/127* (2013.01); *B64C 2201/146* (2013.01); *G06T 2207/10036* (2013.01); *G06T 2210/61* (2013.01)

(56) References Cited

U.S. PATENT DOCUMENTS

| | | |
|---|---|---|
| 2015/0112516 A1 | 4/2015 | Kruglick |
| 2016/0088286 A1 | 3/2016 | Forsythe et al. |
| 2016/0202695 A1 | 7/2016 | Deroos et al. |
| 2016/0307447 A1* | 10/2016 | Johnson .................. B60L 58/12 |
| 2017/0024929 A1 | 1/2017 | Priest |
| 2017/0039859 A1* | 2/2017 | Hu ............................ G09B 9/08 |
| 2017/0134963 A1 | 5/2017 | Priest |
| 2017/0178222 A1 | 6/2017 | High et al. |
| 2017/0192418 A1 | 7/2017 | Bethke et al. |
| 2017/0206414 A1 | 7/2017 | Schultz et al. |
| 2017/0240278 A1 | 8/2017 | Loud et al. |
| 2017/0255198 A1 | 9/2017 | Rodriguez |
| 2017/0337824 A1* | 11/2017 | Chen .................... G08G 5/0086 |
| 2017/0345317 A1* | 11/2017 | Heinonen ............. B64C 39/024 |
| 2018/0204469 A1* | 7/2018 | Moster ................. G05D 1/0094 |
| 2018/0262674 A1* | 9/2018 | Iwakura ................. B64D 17/00 |
| 2019/0011922 A1* | 1/2019 | Feng ..................... G06K 9/2081 |

OTHER PUBLICATIONS

Siebert, Sebastian et al., "Mobile 3D Mapping for Surveying Earthwork Projects Using an Unmanned Aerial Vehicle (UAV) System", Automation in Construction, vol. 41, May 2014, http://www.sciencedirect.com/science/article/pii/S0926580514000193, (pp. 1-14, 14 total pages).

Daftry, Shreyansh et al., "Building with Drones: Accurate 3D Facade Reconstruction Using MAVs", Robotics and Automation International Conference, arXiv:1502.07019v1 [cs.RO], Feb. 25, 2015, http://ieeexplore.ieee.org/document/7139681/, May 26-30, 2015, 8pgs.

PCT/US2018/067621; International Search Report, ISA/210, dated Apr. 17, 2019; 3 pages.

\* cited by examiner

Initial plan for a part of the asset    Updated plan based on local geometry

AUTOMATED AND ADAPTIVE THREE-DIMENSIONAL ROBOTIC SITE SURVEYING

BACKGROUND

The subject matter disclosed herein relates to site surveying, and more particularly, to the autonomous collection of multi-sensory data around an industrial asset for building a three-dimensional model of the asset and its environment. It would be desirable for robots, especially those operating in industrial environments, to have the ability to sense and model their environment autonomously. This model of the environment can then be used to direct other tasks such as inspection, obstacle avoidance, robot localization, and targeting.

Many existing 3D reconstruction systems suffer from several limitations that affect their performance. Typically, the data required for the three-dimensional (3D) reconstruction of assets is collected either by a drone flown manually by a human operator or by a sensing system carried by a human. Note that having a human carry out aspects of the data collection process can be a difficult and error-prone task. This can be especially true when planned data collection will take a substantial amount of time, the collection can potentially take various routes, there are many points of interest to be examined, the asset and/or surrounding environment are complex and dynamically changing, other people and/or robots are simultaneously operating in the area, etc.

Manual data collection provides no assurances that the right data has been collected to generate a 3D reconstruction that meets certain Key Performance Indicators (KPIs) such as ensuring that the images are in focus, directed at the right region of the asset, and have enough overlap across images to build an accurate model. Moreover, manual data collection usually leads to the collection of a large amount of data. As discussed above, currently available systems typically involve a human operator flying a drone manually to capture a large number of images (e.g., in the order of thousands) which are then used to build a 3D model of the asset. Feeding this entire data set to a reconstruction engine can be very computationally expensive. Furthermore, the presence of images that are not in focus or do not have sufficient overlap can lead to degraded reconstruction.

It would therefore be desirable to provide systems and methods to facilitate three-dimensional robotic site surveying in an automatic and adaptive manner.

SUMMARY

Embodiments described herein improve upon the prior art by providing systems and methods for an unmanned robot/vehicle to plan autonomously (e.g., given an asset type) and to update/adapt its mission in real-time ("on-the-fly") based on new information.

In various embodiments, the unmanned aerial system can autonomously collect multi-sensory data regarding an asset for building a 3D model with minimal human intervention. The system generates a mission plan that takes various constraints of a task and the asset into account (e.g., geofences, camera parameters, asset dimensions, and asset type). The various constraints are combined to build a mission plan that captures the right amount of data to maximize 3D reconstruction accuracy. Furthermore, the system can automatically re-plan on-the-fly based on the local geometry of the asset that is sensed by two-dimensional (2D) and three-dimensional (3D) cameras.

In some conventional approaches, the data required for the 3D reconstruction of assets is typically collected either by a drone flown manually by a human operator or by a sensing system carried by a human. For example, a drone is first flown manually (e.g., by a human operator) or on a defined path to capture data/initial imagery, which is then used to build a 3D model of an asset offline. Using offline analytics such as machine learning, the data may be cleaned before being fed to a 3D reconstruction engine. For example, the large number of images collected by a human operator may be pruned to an optimal number (e.g., minimal, relevant set) of data samples needed for accurate 3D reconstruction using sensory models and domain models. However, this requires constant feedback from an operator both for ensuring the images are of the desired quality and that the desired images were captured.

One of the limitations of the conventional approach is that building a 3D model of an asset is a computationally expensive process and is heavily dependent on the size and type of an asset and the number of images collected. Depending on the size of the asset and the power limitations of the drone, the model building operation can take a long time to complete, anywhere from hours to days (e.g., for a typical large industrial asset). Furthermore, these 3D reconstruction engines usually run better on a cloud server where they can be parallelized. However, many of the industrial assets are located in regions where it is difficult to upload a large amount of information over the network. As a result, conventional systems usually take multiple days to build an accurate model of an asset which can then be used to re-generate a mission plan.

To overcome these issues, example herein utilize online sensing to update mission plans on-the-fly in a way that best captures the local geometry for 3D reconstruction. Advantageously, access to a previously built 3D model is not needed. This differs from the conventional solutions where the planning is done offline and the drone flies the mission in an open-loop fashion.

According to various embodiments, the present system automatically computes the proper location and camera/viewing angles from which to take images that achieve efficient image retrieval (e.g., with respect to image overlap) and pinpointing the correct regions of interest with respect to an asset. Furthermore, data from an imaging sensor can be fed back to the system to evaluate the image quality and take appropriate action where necessary. A drone may then autonomously fly the mission during which its location and camera locations are tracked. Images are captured only at planned locations and appropriate metadata such as drone position and orientation are saved. In this way, the least number of images are collected while meeting the required reconstruction accuracy. Furthermore, the present system allows a robot to adapt its plan on-the-fly to best capture parts of the asset based on its sensing of the local geometry.

Technical advantages provided by the 3D reconstruction system include being able to automatically determine the optimal locations to image the asset that leads to an accurate reconstruction of the asset with minimal images, and allowing a drone to track its mission and take corrective actions based on sensed information such as local geometry.

Commercial advantages provided by the 3D reconstruction system include allowing an operator (e.g., engineer) to quickly collect an appropriate amount and fidelity of data (e.g., minimum number of images needed) to create a high-fidelity 3D model of an asset. Conventional methods of 3D reconstruction are computationally expensive processes that are highly dependent on the number of images taken. The present method of capturing the images optimally leads to the reduction in the amount of time needed to build the model, which in turn reduces the time to availability of actionable information. Moreover, not only is building an accurate 3D model useful for measuring parts on the asset, so is allowing for the creation of targeted inspection plans where a drone can be directed to go to certain locations on the asset to collect imagery.

Other features and aspects may be apparent from the following detailed description taken in conjunction with the drawings and the claims.

BRIEF DESCRIPTION OF THE DRAWINGS

Features and advantages of the example embodiments, and the manner in which the same are accomplished, will become more readily apparent with reference to the following detailed description taken in conjunction with the accompanying drawings which are briefly described as follows.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

Some embodiments described herein relate to providing intelligent and automated environmental sensing and modeling for an unmanned robot. Such embodiments may be useful when used to direct tasks such as inspecting industrial assets associated with various entities, including business or corporate entities, governments, individuals, non-profit organizations, and so forth. As discussed herein, such assets may be generally discrete or limited in their extent (e.g., a vehicle such as a plane, helicopter, ship, submersible, space launch vehicle, satellite, locomotive, and so forth) or may be geographically distributed (e.g., a road or rail track, a port or airport, a pipeline or electrical infrastructure, a power generation facility or manufacturing plant, and so forth). Some embodiments described herein may be used to inspect assets of these types (as well as others not listed) in a manual, autonomous, or semi-autonomous manner using robotic intermediaries.

Figure 1:
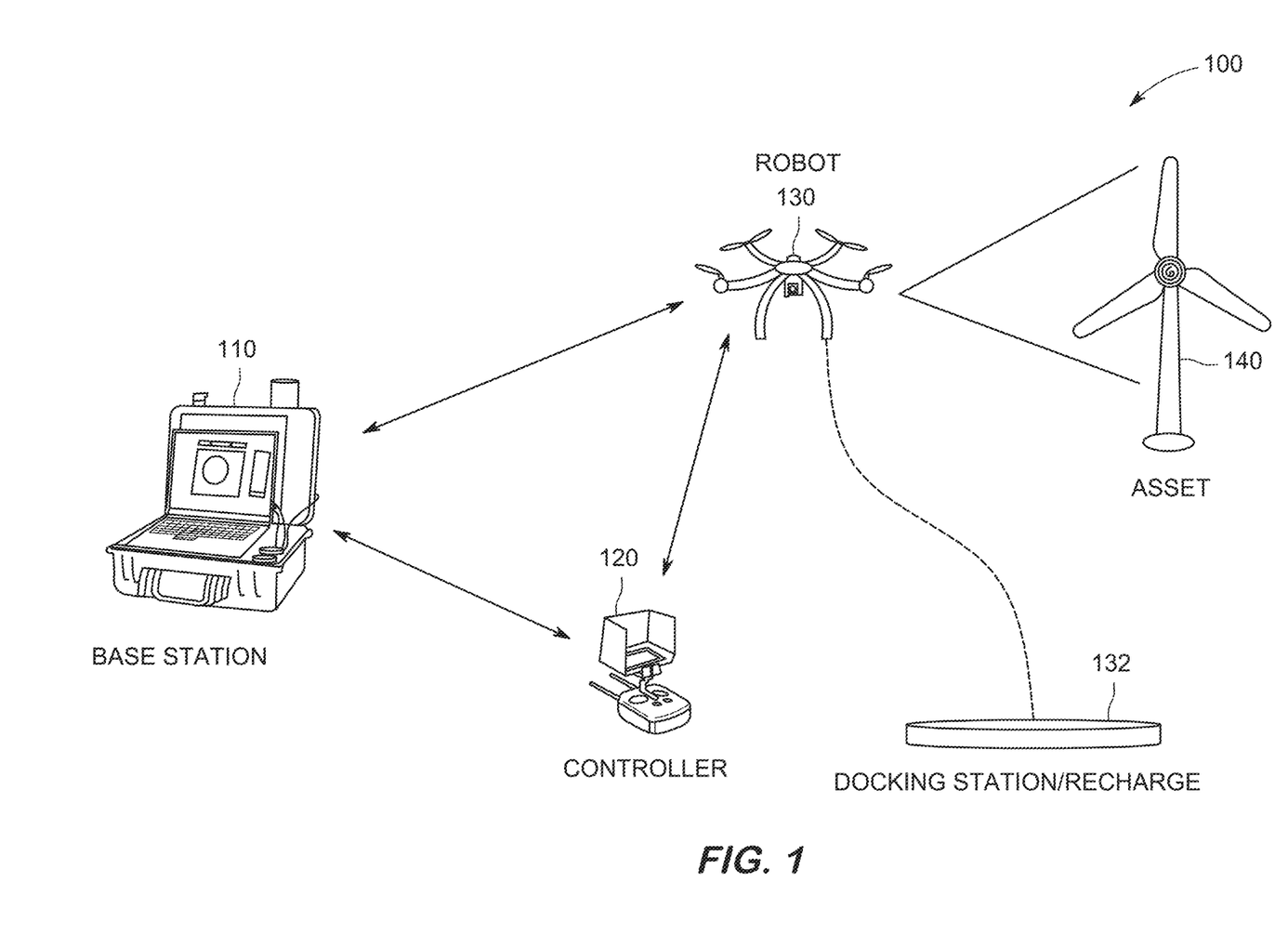
FIG. 1 is a diagram illustrating a robotic system according to some embodiments.

FIG. 1 illustrates a robotic system 100 according to some embodiments. Referring to FIG. 1, the robotic system 100 includes an unmanned robot 130 that collects multisensory data around an asset 140. For example, the unmanned robot 130 may include an unmanned aerial vehicle (UAV) such as a drone, a crawling robot, a rolling robot, a walking robot, an autonomous underwater vehicle (AUV), and/or the like. In the example of FIG. 1, the unmanned robot 130 includes a docking station 132 for recharging and storage. Also, the unmanned robot 130 may communicate with a controller 120 and/or a base station 110. For example, the controller 120 and the base station 110 may receive data from and transmit data to the unmanned robot 130 via a data communication channel. Also, in some examples the base station 110 may receive input from a user (e.g., an engineer) sending commands to the unmanned robot 110 via the data communication channel. The communication channel may be wireless, for example, satellite, cellular, local, and/or the like, and/or it may be wired in some instances. For example, the user may input certain information about an asset such as asset dimensions, asset type, and required data fidelity, which is used to build a mission plan that obeys the various mission constraints. The mission is then fed wirelessly to an unmanned aerial vehicle 130 that executes the mission and collects the required images (e.g., both 2D and 3D). These images along with the metadata are fed to a 3D reconstruction system to build an accurate 3D model of the asset.

The asset 140 may be a structure that is disposed at a geographical location accessible by the unmanned robot 130. For example, the asset 140 may be an oil platform disposed at sea, a tank or well that is disposed under the earth's surface, a pipeline disposed along the earth's surface, a bridge, a dam, a gas flare, a turbine, a power grid, an aircraft, a locomotive, and/or the like. Based on a mission plan, the unmanned robot 130 may autonomously move about and around the asset 140 while inspecting (e.g., collecting data) from the asset 140. In the example of FIG. 1, the unmanned robot 130 is a drone that can fly about the asset 140. The drone can land on locations on a surface of the asset 140, pause in mid-air, and the like. As described herein, the drone 130 may fly about a travel path around the asset 140 based on a 3D model of a virtual travel path included in a flight plan. In some cases, the drone 130 may also receive instructions providing a travel path from the docking station 132 to a starting point of the flight plan.

Note that the unmanned robot 130 may include at least one sensor to collect the sensor data. According to some embodiments, a sensor might be associated with, for example, a camera (e.g., a Red-Green-Blue ("RGB") camera), a video camera, an Infra-Red ("IR") camera, a microphone, a chemical detector, a Light Detection and Ranging ("LIDAR") sensor, a radiation detector, etc. Although some examples are described herein in connection with a single inspection device or robot, note that an inspection (e.g., site survey) plan might instead be associated with a plurality of inspection devices or robots simultaneously collecting information.

According to various embodiments, the unmanned robot 130 may perform an inspection of a plurality of regions of interest of the asset 140 based on a 3D virtual mission plan that is received from the base station 110, the controller 120, or input locally through the unmanned robot 130. The regions of interest may be positioned at various distributed locations throughout the asset 140, clustered within a predefined area of the asset 140, and/or the like. Each region of interest may include a position such as a point of interest, an area of interest, etc., to be inspected on the asset, an angle at which the camera (or other sensor) should be positioned with respect to a surface of the asset at the region of interest, an angle of rotation about the asset that the drone should travel while capturing sensor data, and the like.

Figure 2:
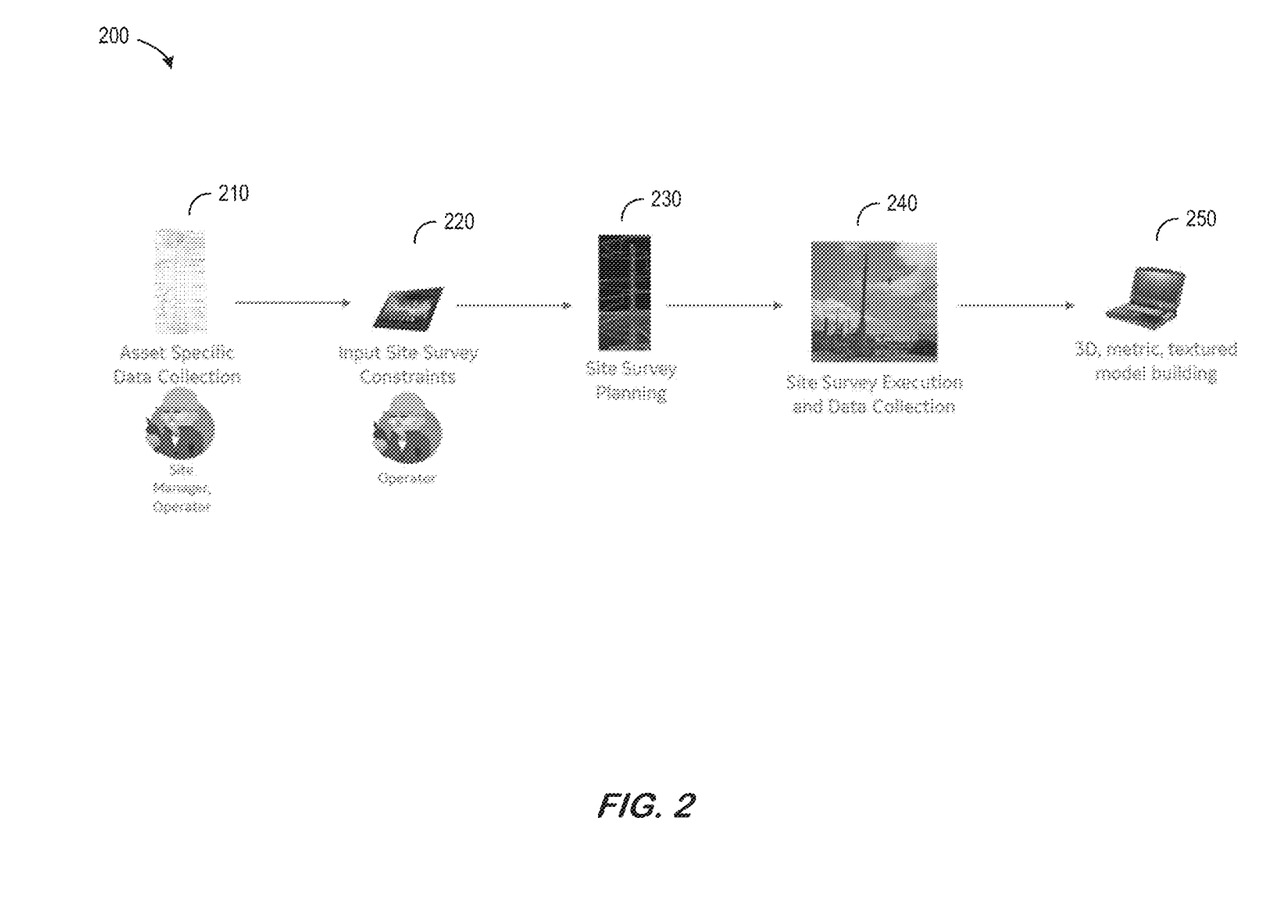
FIG. 2 is a diagram illustrating an overview of a site-survey system according to some embodiments.

FIG. 2 is a diagram illustrating an overview of a site-survey system according to some embodiments. The system uses asset-specific constraints 210 and site survey constraints 220 provided by an operator (e.g., user, technician, engineer, etc.) to generate a site survey plan (e.g., mission) at 230. The plan is then executed by a UAV (e.g., drone) and updated on-the-fly at 240 to optimize for local geometry. Once the required two-dimensional (2D) and three-dimensional (3D) imagery is collected, it is passed to a 3D reconstruction engine at 250 to generate a textured, metric, 3D model of the asset.

Figure 3:
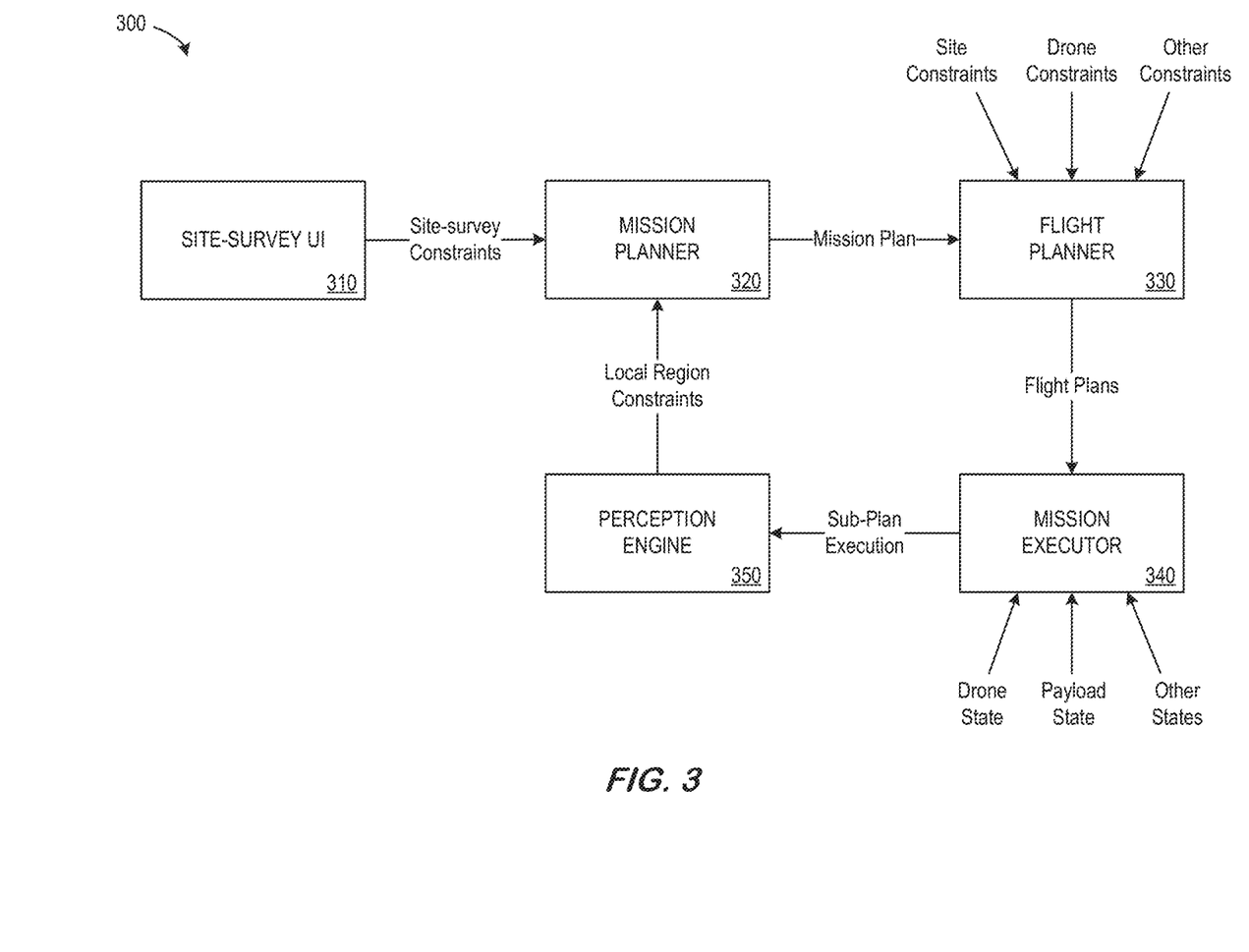
FIG. 3 is a block flow diagram illustrating an exemplary process according to some embodiments.

Reference is now made to FIGS. 3 through 6, which will be discussed together. FIG. 3 is a block flow diagram illustrating an exemplary process 300 according to some embodiments. For example, process 300 may be performed by the software and/or the system described herein. Process 300 provides a structure to build an accurate 3D model of an asset.

Figure 4:
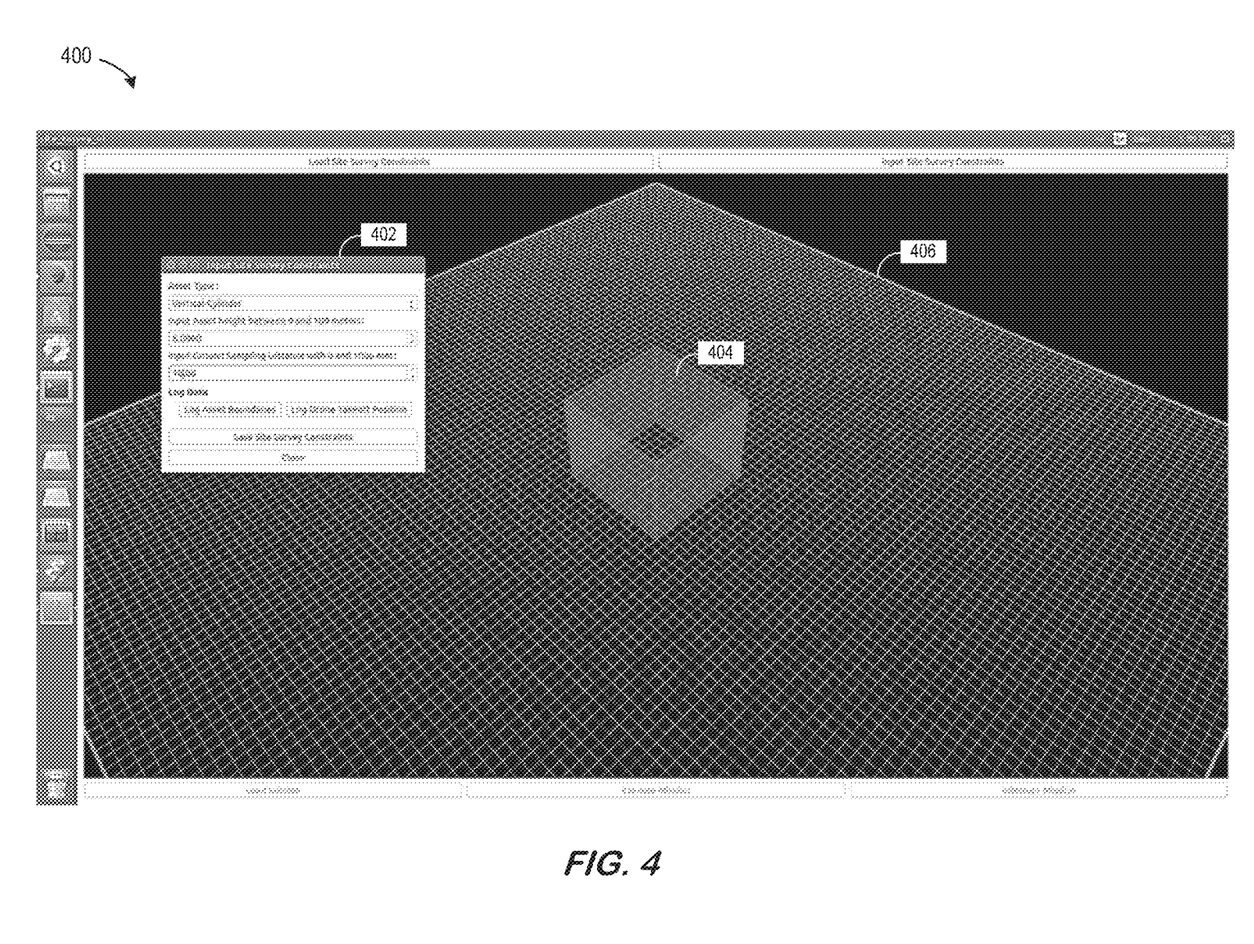
FIG. 4 is an outward view of a user interface according to some embodiments.
Figure 5:
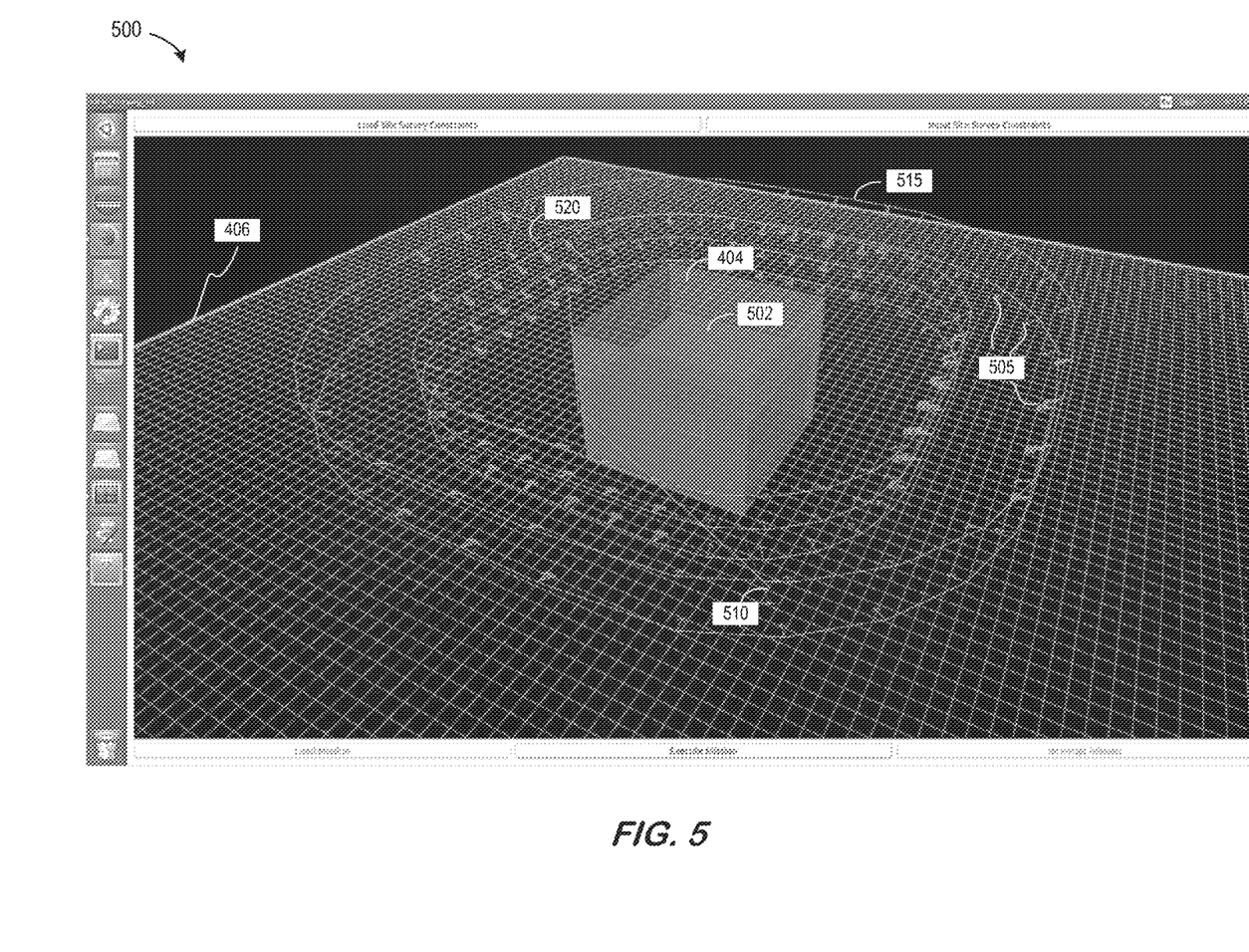
FIG. 5 is an outward view of a user interface according to some embodiments.

FIG. 4 is an outward view of a user interface 400 according to some embodiments. FIG. 5 is an outward view of a user interface 500 according to some embodiments.

Figure 6:
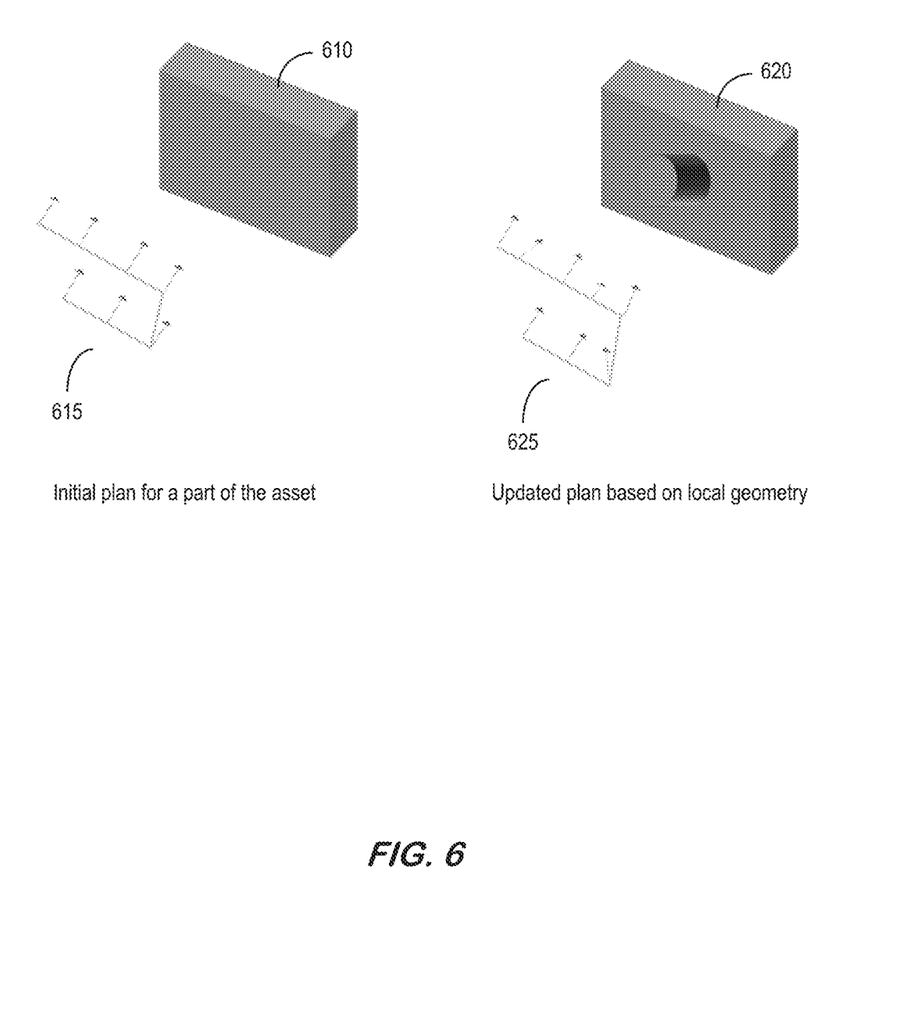
FIG. 6 is a diagram illustrating an example of how a local plan changes based on the geometry of an asset according to some embodiments.

FIG. 6 is a diagram illustrating an overview of how a local/initial plan for a part of an asset changes based on the geometry of the asset, which may be determined by 2D and 3D sensors on a drone.

Turning to FIG. 3, site-survey planning and execution system includes a site survey user interface (UI) 310, a mission planner 320, a flight planner 330, a mission executor 340, and a perception engine 350.

In order to generate a site survey plan, a user interface (e.g., application or other software) may be provided and may be interacted with via a user device such as the base station, a tablet, or other computer, allowing a user such as an inspector or operator to input asset-specific and site survey constraints with respect to an inspection site. Here, site survey UI 310 provides a means for users of the system to enter constraints (e.g., site and mission-specific constraints). For example, as shown in FIG. 4, the user may select parameter values (e.g., site and mission specific constraints) from a drop-down menu 402 or similar user interface feature for which to send to mission planner 320.

In some embodiments, the constraints may include asset constraints (e.g., asset type, asset dimensions, etc.), three-dimensional reconstruction constraints (e.g., ground sampling distance (GSD), image overlap, camera parameters such as focal length and sensor size, a desired resolution (pixels/inch) and/or a minimum resolvable feature such as a crack of a certain size, etc.), and mission constraints (e.g., minimum safe/back-off distance of the robot from asset, geofence constraints, etc.).

As a result of the input operation(s) 402, user interface 400 may be presented with geofence constraints 404 and 406, which outlines virtual perimeters designating one or more areas of interest and/or area(s) not of interest. For example, a flight plan should not include any area within the dimensions/cubical area 404 and should not exceed boundary 406.

Mission planner 320 uses the constraints of the system to compute a mission plan that provides the optimal coverage of the asset to ensure a required image quality and coverage. Since the mission plan is generated without the mission planner 320 having access to a three-dimensional model of the asset, the information of a representative asset type is used to generate the plan. The representative asset 502 is expressed in terms of primitive shapes and parameters (e.g., cylindrical asset, rectangular asset, horizontal asset, etc.). The dimensions of the representative asset (e.g., area for inspection) may be determined either by information entered via user interface 400 or by user observation and judgment. This global geometry information is used to generate a mission plan that best covers the asset given the constraints.

A non-limiting example of a travel path environment is shown in FIG. 5 via a screen shot of a user interface 500. FIG. 5 illustrates an example of a mission plan and flight plan generated for a representative rectangular asset. Geofence boundaries 404, 406 indicate the exclusion zones that the drone cannot violate. The generated mission plan includes a list of camera locations/positions and orientations with respect to the asset 502. In this example, arrows 505 illustrate waypoints returned by the mission planner 320. The position of the arrow 505 indicates the camera position, and the orientation of the arrow indicates the camera orientation (e.g., viewpoint or viewing angle of one or more sensors on the drone). Line 515 illustrates the generated flight plan/route (e.g., drone flight inspection plan).

Each travel path (e.g., flight route) may correspond to a sequence of travel paths and waypoints in real space. For example, the sequence of travel paths (e.g., regions of interest on a flight path) may be connected by a continuous line 515 in virtual space between a virtually selected beginning point 510 and a virtually selected end point 520 of the travel path 515. The line of the travel path 515 may move continuously while changing throughout in each of X, Y, and Z coordinate axes within virtual space thereby simulating continuous three-dimensional movement of the robot that is highly accurate. In addition, the travel path 515 may wrap around the asset 502 one or more times while at the same time changing in each of X, Y, and Z coordinate axes along a continuous line generated by the system described herein.

The travel path 515 in virtual space may be aligned with a physical travel path in the physical space (e.g., real world), for example, by a flight planning application. Waypoints in real space correspond to regions of interests on the virtual space, and are points at which data and photos are to be captured by the robot. For example, in addition to video and still images, the data to be captured may include thermal images, ultraviolet images, sniffing for chemical concentrations, and the like, of various asset parts, asset sub-regions, and the like. The route planning can be done in multiple passes, for example, using RGB camera and IR camera separately. In addition, the site survey plan can be adjusted on the inspection site to focus on certain points of interest. For example, an IR camera pass may detect hot spots that are set for further site surveying using the RGB camera.

Interface 400, 500 may be presented on any type of display apparatus (e.g., desktop monitor, smartphone display, tablet display) provided by any type of client (e.g., desktop system, smartphone, tablet computer). The application which is executed to provide interface 400, 500 may comprise a Web browser, a standalone application, or any other application. Embodiments are not limited to interface 400, 500, and may include user interfaces having any particular type, format, or function.

Next, the mission plan information is provided to flight planner 330. Flight planner 330 computes a feasible flight plan that a drone can execute given one or more predefined criteria including environmental/site, drone, and task constraints, etc. The environmental/site constraints include exclusion zones beyond which a drone is not allowed to fly because of safety reasons. The drone constraints include information about the drone position and gimbal limitations. The task constraints can vary from finding the shortest path (e.g., minimized distance/time) from one waypoint to the next waypoint, to the path with least amount of energy consumed, and the like. In some cases, the least amount of energy consumed may include the least amount of rises required by the unmanned robot because going against the force of gravity can consume the most power. The flight planner 330 finds an optimal path that meets all the above constraints to generate a flight trajectory/plan connecting the various waypoints.

In turn, the flight plan information is provided to mission executor 340. The mission executor module 340 accepts the flight plans from flight planner 330 and executes a sub-plan (e.g., local plan) to each waypoint. The mission executor also monitors the state of the robot (e.g., drone state, payload state, etc.) and takes actions accordingly. For example, if the drone is flying in windy conditions, and the drone deviates from its trajectory, the mission executor provides control commands to the drone to bring it back to its required trajectory or abort the execution when necessary. Once the drone reaches a goal waypoint, the mission executor orients the gimbal and captures the required imagery.

Referring to FIG. 6, and as described above, the generated mission plan 615 is based on the assumption that the asset is similar to a particular representative shape 610. However, as shown in FIG. 6, the actual shape 620 of an asset, in reality, can have a large number of local variations. Perception engine 350 provides a way to infer the local geometry 625 of the asset and adapt the mission plan accordingly. The perception engine uses information from a 2D camera and a LIDAR system to compute the local geometry 625 of the asset 620 at a waypoint (e.g., local region constraints). This information is used to modify the mission plan. Some manners of modifying the mission include modifying the camera orientation at which the imagery is captured, adding more waypoints in the vicinity of the waypoint that best captures the local geometry, and modifying the already planned waypoints that are in the local vicinity based on the additional information.

Figure 7:
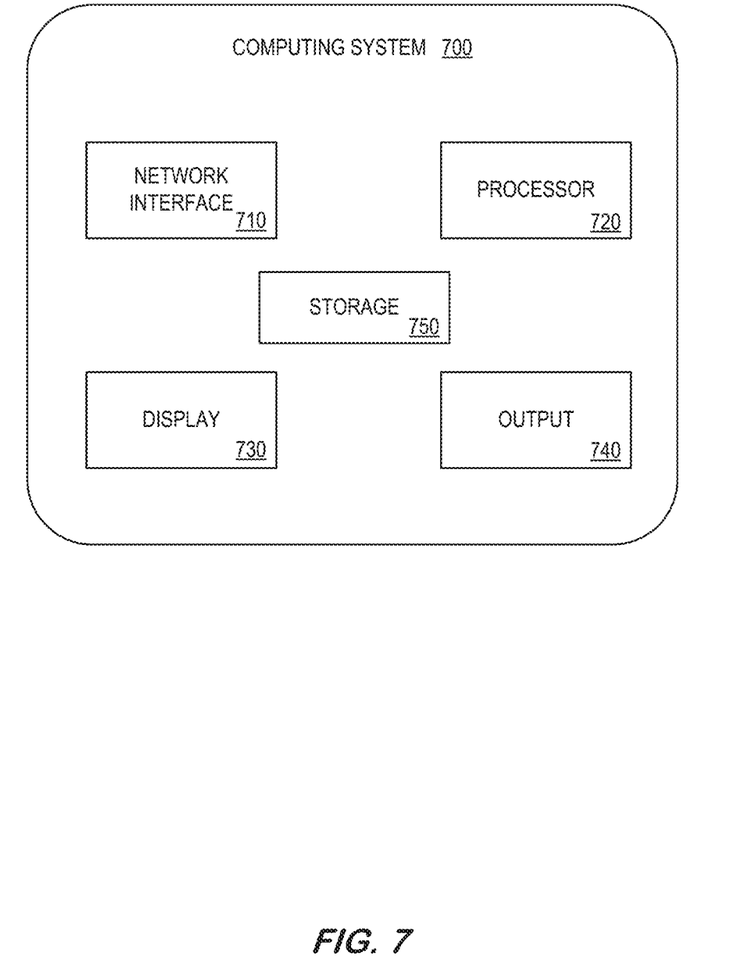
FIG. 7 is a block diagram of a computing system according to some embodiments.

FIG. 7 is a diagram illustrating a computing system 700 for generating a site surveying (e.g., data collection) plan for building a 3D model of an asset according to some embodiments. For example, the computing system 700 may be a device or group of devices that communicate with a robot and control the robot via a wired or wireless connection. Referring to FIG. 7, the computing system 700 includes a network interface 710, a processor 720, a display 730, an output 740, and a storage 750. Although not shown in FIG. 7, the robotic system 700 may include other components such as an input unit, one or more storage devices, etc. The network interface 710 may be a data communication interface that transmits and receives data over a network such as the Internet, a private network, a public network, and the like, via a satellite network, a cellular network, a local network, and/or the like.

The processor 720 may include one or more processing devices each including one or more processing cores. In some examples, the processor 720 is a multicore processor or a plurality of multicore processors. Also, the processor 720 may be fixed or it may be reconfigurable. According to various embodiments, the processor 720 may execute a site survey planning application that includes a user interface configured to display a site survey plan for execution by an unmanned robot. The user interface may receive and the processor 720 may detect selections of a plurality of asset-specific and site survey constraints for collecting imagery.

The storage 750 may store a site survey plan including a travel path for the robot and regions of interest of an asset that are to be inspected. The storage 750 may also store data captured while the computing system 700 performs the site survey process. In an example embodiment, images are captured at planned locations and metadata such as drone position and orientation are saved in a storage 750 that is associated with the system 700. The storage device 750 is not limited to any particular storage device and may include any known memory device such as RAM, ROM, hard disk, and the like. The output 740 may output a site survey plan comprising the generated travel path about the asset for the unmanned robot to a display or another device or system such as the unmanned robot itself and/or a control device.

The display 730 may display a user interface and other data via an embedded display of the system 700 or another device externally connected to the system 700, and the like. The output 740 may output the user interface and other data to the display 730.

Although the examples herein are provided, for the most part, with respect to assets on land it should be appreciated that the embodiments may be incorporated with submersible drones for inspecting underwater assets. In this situation, the virtual created 3D travel path would be created in the same way but instead of a travel path being through the air it would be through water or some other liquid based environment such as oil, etc.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A system for generating a three-dimensional model of an asset, comprising:
   a memory storing instructions; and
   a processor configured to execute the instructions, wherein the instructions, when executed by the processor, cause the processor to:
   receive input parameters corresponding to constraints of a mission plan for operating an unmanned vehicle around the asset, wherein the constraints comprise an inner geofence that corresponds to a representative shape of the asset and an outer geofence that defines an exclusion zone for the unmanned vehicle;
   generate the mission plan based on the input parameters, wherein the mission plan defines a plurality of waypoints indicative of locations and orientations of one or more image sensors of the unmanned vehicle with respect to the asset;
   generate a flight path for the unmanned vehicle based on the mission plan that extends between the inner geofence and the outer geofence by connecting the waypoints;
   determine, via the one or more image sensors, a local geometry of the asset at each of the waypoints during execution of the mission plan;
   update the mission plan to an updated mission plan having updated waypoints based on a determination that the local geometry differs from the representative shape; and
   capture images of the asset at the updated waypoints corresponding to the updated mission plan.

2. The system of claim 1, wherein the processor is further configured to monitor a vehicle state of the unmanned vehicle during execution of the flight path.

3. The system of claim 1, wherein the input parameters further comprise asset constraints, three-dimensional reconstruction constraints, mission constraints, or a combination thereof.

4. The system of claim 1, wherein the one or more image sensors comprise a camera, a video camera, an infra-red camera, a microphone, a chemical detector, a Light Detection and Ranging ("LIDAR") sensor, a radiation detector, or a combination thereof.

5. The system of claim 1, wherein the representative shape is expressed in terms of primitive shapes and parameters that are derived without access to a three-dimensional reference model of the asset.

6. The system of claim 1, wherein updating the mission plan comprises modifying the orientation of the one or more image sensors, adding additional waypoints to the flight path, modifying respective positions of the waypoints to adjust the flight path, or a combination thereof.

7. The system of claim 1, wherein the constraints further comprise environmental constraints, vehicle constraints, task constraints, or a combination thereof.

8. A method for generating a three-dimensional model of an asset, comprising:
   receiving input parameters corresponding to constraints of a mission plan for operating an unmanned vehicle around the asset, wherein the constraints comprise an inner geofence that corresponds to a representative shape of the asset and an outer geofence that defines an exclusion zone for the unmanned vehicle;
   generating the mission plan based on the input parameters, wherein the mission plan defines a plurality of waypoints indicative of locations and orientations of one or more image sensors of the unmanned vehicle with respect to the asset;
   generating a flight path for the unmanned vehicle based on the mission plan that extends between the inner geofence and the outer geofence by connecting the waypoints;
   determining, via the one or more image sensors, a local geometry of the asset at each of the waypoints during execution of the mission plan;
   updating the mission plan to an updated mission plan having updated waypoints based on a determination that the local geometry differs from the representative shape; and
   capturing images of the asset at the updated waypoints corresponding to the updated mission plan.

9. The method of claim 8, further comprising monitoring a vehicle state of the unmanned vehicle during execution of the flight path.

10. The method of claim 8, wherein the input parameters further comprise asset constraints, three-dimensional reconstruction constraints, mission constraints, or a combination thereof.

11. The method of claim 8, wherein the one or more image sensors comprise a camera, a video camera, an infra-red camera, a microphone, a chemical detector, a Light Detection and Ranging ("LIDAR") sensor, a radiation detector, or a combination thereof.

12. The method of claim 8, wherein the representative shape is expressed in terms of primitive shapes and parameters.

13. The method of claim 8, wherein updating the mission plan comprises modifying the orientation of the one or more image sensors, adding additional waypoints to the flight path, modifying respective positions of the waypoints to adjust the flight path, or a combination thereof.

14. The method of claim 8, wherein the constraints further comprise environmental constraints, vehicle constraints, task constraints, or a combination thereof.

15. A non-transitory computer readable medium having instructions stored thereon, wherein the instructions, when executed by a processor, cause the processor to:
   receive input parameters corresponding to constraints of a mission plan for operating an unmanned vehicle around an asset, wherein the constraints comprise an inner geofence that corresponds to a representative shape of the asset and an outer geofence that defines an exclusion zone for the unmanned vehicle;

generate the mission plan based on the input parameters, wherein the mission plan defines a plurality of waypoints indicative of locations and orientations of one or more image sensors of the unmanned vehicle with respect to the asset;

generate a flight path for the unmanned vehicle based on the mission plan that extends between the inner geofence and the outer geofence by connecting the waypoints;

determine, via the one or more image sensors, a local geometry of the asset at each of the waypoints during execution of the mission plan;

update the mission plan to an updated mission plan having updated waypoints based on a determination that the local geometry differs from the representative shape; and capture images of the asset at the updated waypoints corresponding to the updated mission plan.

16. The non-transitory computer readable medium of claim 15, wherein the instructions, when executed by the processor, cause the processor to monitor a vehicle state of the unmanned vehicle during execution of the flight path.

17. The non-transitory computer readable medium of claim 15, wherein the input parameters further comprise asset constraints, three-dimensional reconstruction constraints, mission constraints, or a combination thereof.

18. The non-transitory computer readable medium of claim 15, wherein the constraints further comprise environmental constraints, vehicle constraints, task constraints, or a combination thereof.

\* \* \* \* \*